W. N. GILBERT.
WEIGHING SCALE.
APPLICATION FILED AUG. 7, 1907.
983,990.
Patented Feb. 14, 1911.
5 SHEETS—SHEET 1.
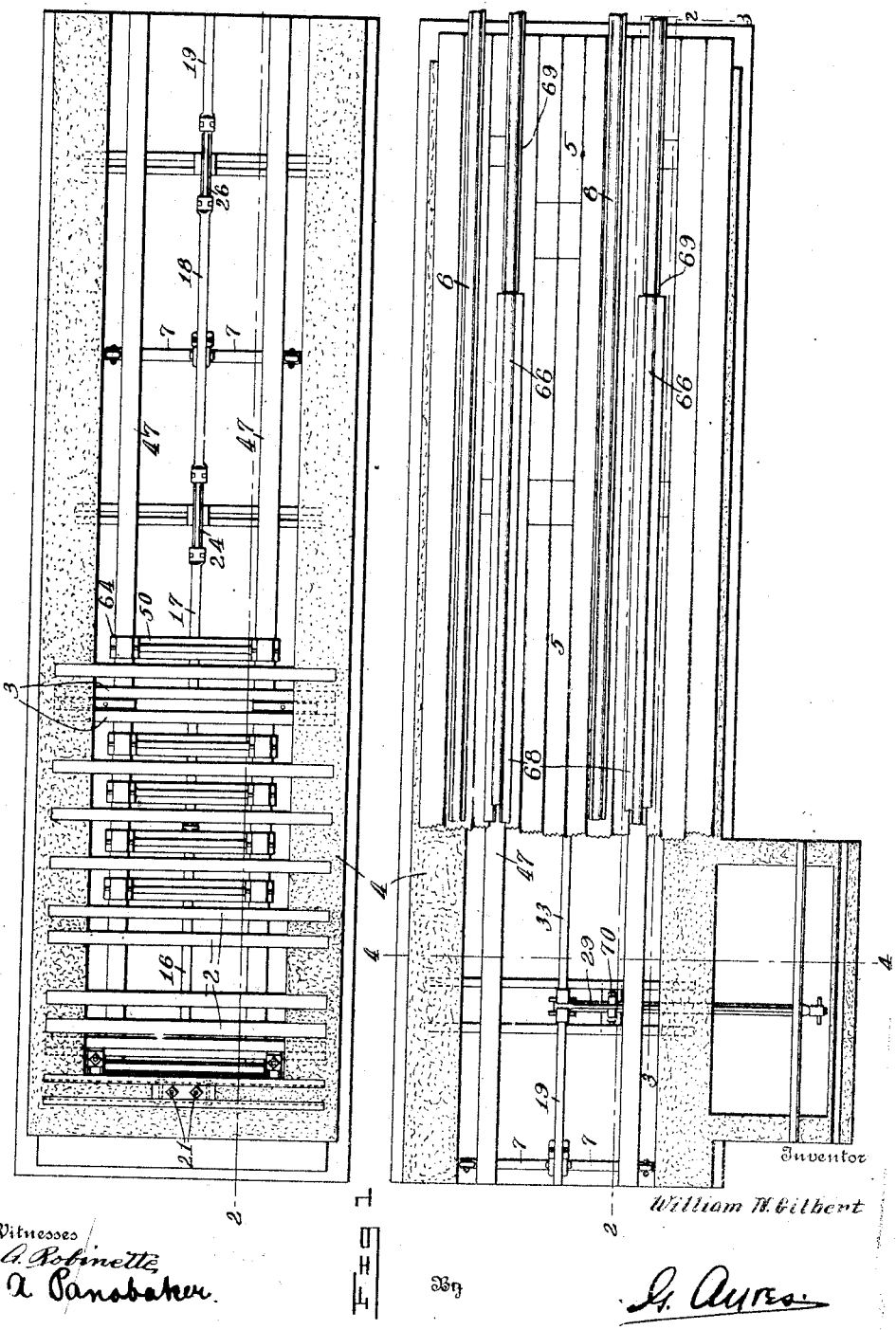
Witnesses
H. A. Robinette
E. A. Panabaker
Inventor
William N. Gilbert
By
G. Ayres
Attorney

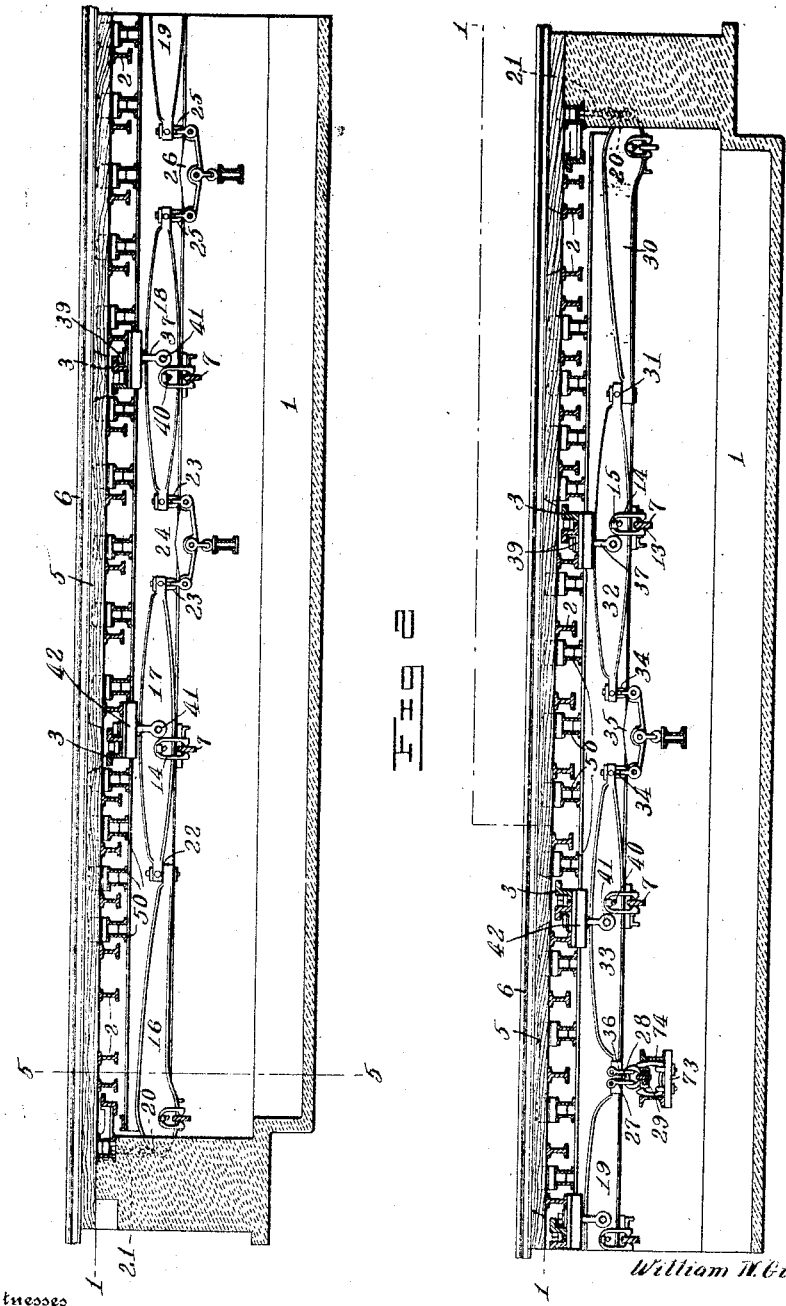

W. N. GILBERT.
WEIGHING SCALE.
APPLICATION FILED AUG. 7, 1907.
983,990.
Patented Feb. 14, 1911.
5 SHEETS—SHEET 3.
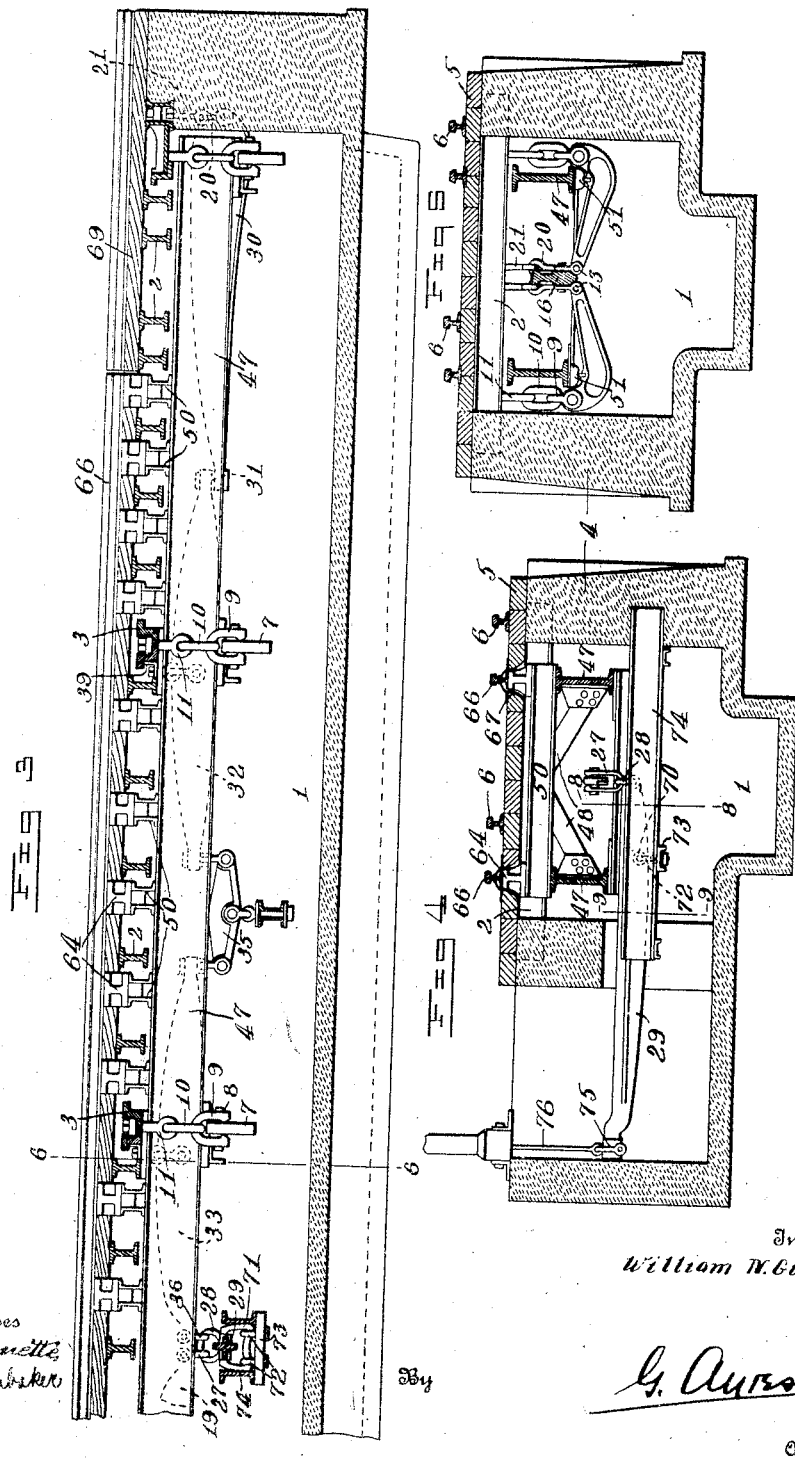
Witnesses
H. C. Robinette
E. A. Pansbaker
Inventor
William N. Gilbert
By G. Ayres
Attorney W. N. GILBERT.
WEIGHING SCALE.
APPLICATION FILED AUG. 7, 1907.
983,990.
Patented Feb. 14, 1911.
5 SHEETS—SHEET 4.
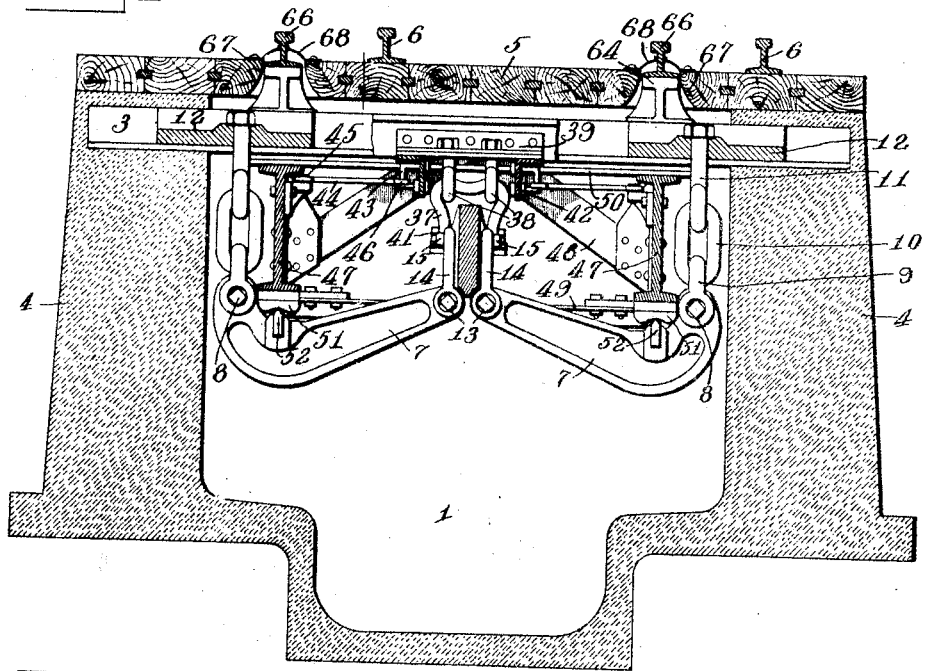
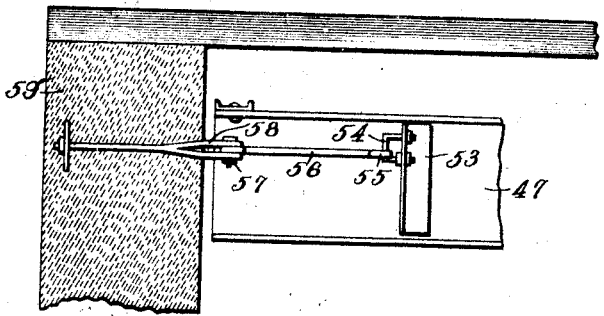
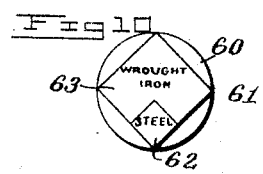
Witnesses
H. A. Robinette
E. A. Panabaker
Inventor
William N. Gilbert
By G. Ayres
Attorney W. N. GILBERT.
WEIGHING SCALE.
APPLICATION FILED AUG. 7, 1907.
983,990.
Patented Feb. 14, 1911.
5 SHEETS—SHEET 5.
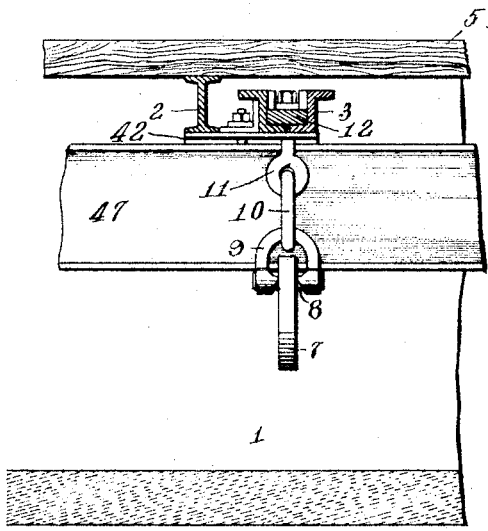
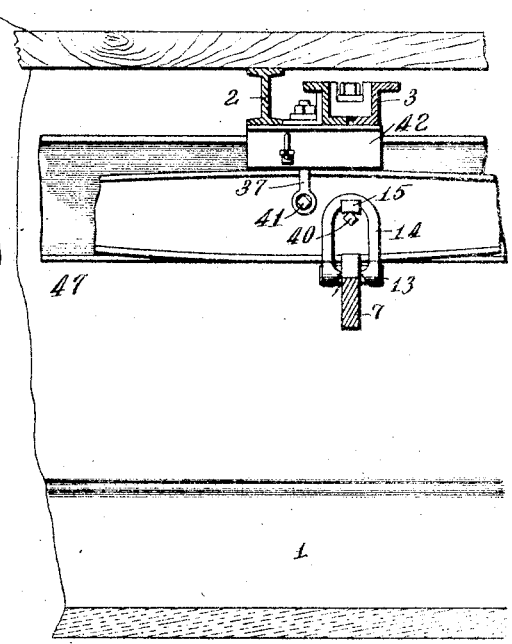
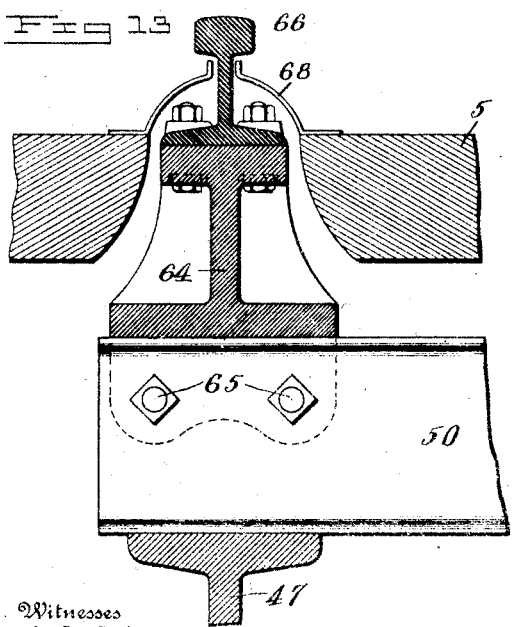
Witnesses
H. C. Robinette
E. A. Panabaker
Inventor
William N. Gilbert
By G. Ayres
Attorney

UNITED STATES PATENT OFFICE.

WILLIAM N. GILBERT, OF BINGHAMTON, NEW YORK.

WEIGHING-SCALE.

983,990.  Specification of Letters Patent.  Patented Feb. 14, 1911.

Application filed August 7, 1907. Serial No. 387,436.

*To all whom it may concern:*

Be it known that I, WILLIAM N. GILBERT, a citizen of the United States, residing at Binghamton, in the county of Broome and State of New York, have invented certain new and useful Improvements in Weighing-Scales, of which the following is a specification.

My invention relates to improvements in weighing scales, and it consists in the constructions, combinations and arrangements herein described and claimed.

An object of my invention is to provide an improved weighing scale especially adapted for railway scales, in which a stationary platform extends between the usual track rails, and is provided with slots through which extend the live rails constituting the load supports of the scale; the only portion of the scale exposed being the live rails extending upward through slots in the stationary platform. In this improved construction, the stationary platform provides an efficient protection against the entrance of foreign substances, such as dirt, snow, etc., t the scale, and also eliminates all danger of injury or breakage of the scale upon derailment of the cars, or other abnormal conditions.

A further object of my invention is to provide a weighing scale having a self-contained system of weighing levers comprising coöperating sets of main levers and extension levers, in which the several levers of each set are suspended from a common support; thereby insuring the maintenance of accurate adjustment in the scale, and obviating the defects occurring in existing types of scales through mounting the several levers on separate and independent supports.

A further object of my invention is to provide an improved construction, in which the load is positively confined to an intermediate portion spaced from the ends of the system of weighing levers, and the shock and wear incident to localization of the load along any portion of said system is avoided.

In the accompanying drawings, forming a part of this application, and in which similar reference symbols indicate corresponding parts in the several views:—Figure 1 is a plan view on the line 1—1 of Fig. 2, illustrating one embodiment of my invention; the main levers being omitted from the left hand end of said figure for clearness, and the transverse supporting beams being similarly omitted from the intermediate portion of the figure. Fig. 2 is a longitudinal sectional view on the line 2—2 of Fig. 1; Fig. 3 is a longitudinal sectional view, on a larger scale, on the line 3—3 of Fig. 1; Fig. 4 is a transverse sectional view on the line 4—4 of Fig. 1; Fig. 5 is a transverse sectional view on the line 5—5 of Fig. 2; Fig. 6 is a transverse sectional view on the line 6—6 of Fig. 3; Fig. 7 is a detail sectional view, illustrating guiding means engaging the end portions of the longitudinal I-beams for controlling the movement of the movable scale frame; Fig. 8 is a section view, on a larger scale, on the line 8—8 of Fig. 4; Fig. 9 is a sectional view, on a larger scale, on the line 9—9 of Fig. 4; Fig. 10 is a detail end view of a preferred form of pivot; Fig. 11 is a detail sectional view in the same plane as Fig. 3, showing on a larger scale the support for the outer end of one of the main levers; Fig. 12 is a detail sectional view, on the same plane as Fig. 2, showing on a larger scale, the support for one of the extension levers and the connection of the main levers thereto; and Fig. 13 is a detail sectional view, clearly showing one of the live rails supported on the movable scale frame and extending through a slot in the stationary platform.

Referring to the drawings, 1 indicates a pit which may be lined and walled with concrete. A plurality of cross I-beams 2 and Z-beams 3 are shown embedded in the longitudinal walls 4 of the pit and supporting a stationary platform 5, which latter extends between and constitutes the road-bed of the usual dead track rails 6.

A series of pairs of main levers 7 have their outer ends fulcrumed at 8 in yokes 9 supported by links 10, which latter are carried by I-bolts 11 extending through blocks 12 secured to the Z-beams 3. The inner ends of each pair of main levers are pivoted at 13 to yokes 14 carrying bearing blocks 15. A series of extension levers are suspended in the pit for coöperating with said main levers. Referring especially to Fig. 2, I have shown such series comprising a left hand set of four levers 16, 17, 18 and 19. The end extension lever 16 is fulcrumed in a yoke 20 supported on bolts 21 secured to the cross beams, and is pivotally connected at 22 to the adjacent extension lever 17; the levers 17 and 18 are connected by links 23 to opposite ends of an equalizing lever 24; the levers 18 and 19 are similarly connected by links 25 to opposite ends of an equalizing lever 26; and the lever 19 is pivotally connected to a yoke 27 engaging an eye 28 secured to the inner end of a scale lever 29. The right hand set of extension levers comprises an end lever 30 having its outer end fulcrumed in a yoke 20 and supported on bolts 21, in a manner similar to the support of the extension lever 16; the inner end of said lever 30 is pivotally connected at 31 to the adjacent extension lever 32; the extension levers 32 and 33 are connected by links 34 to the ends of an equalizing lever 35; and the end of the lever 33 is connected by a yoke 36 to the eye 28 on the scale beam 29. Each of the extension levers 17, 18, 19, 32 and 33 is fulcrumed at 41 in a yoke 37 supported by I-bolts 38 carried by angle plates 39, which latter is secured to the Z-beams 3 and one of the adjacent I-beams 2. A pivot 40 extends through each extension lever adjacent to its fulcrum for engagement by the bearing blocks 15 carried by the yokes 14 on the inner ends of the corresponding pair of main levers 7; the space between the pivots 40 and the fulcrums 41 being determined by the leverage and character of lever desired.

Fig. 10 illustrates a preferred construction for the fulcrums and pivots of the several levers. In this construction, the pivot is formed with a cylindrical central portion 60 adapted to extend through and be secured to the lever, and with squared ends 61 adapted to enter the eyes of the supporting yokes. The squared ends are formed with steel bearing edges 62 embedded in the wrought iron body portion 63; thereby insuring a durable and strong pivotal support.

From the above description, it will be seen that each pair of main levers and their coöperating extension lever constitute a set of levers fulcrumed in yokes suspended from a common support; thereby insuring an accurate maintenance of the proper relation between said several levers, and eliminating the danger of the levers becoming shifted out of adjustment, which is incident to the employment of independent lever supports in previous types of scales. Further, it will be clear that the yokes 9, links 10 and I-bolts 11 supporting the fulcrums of the main levers, and the yokes 37 and I-bolts 38 supporting the fulcrums of the extension levers permit slight longitudinal adjustment of said levers to compensate for variations in temperature and other practical conditions.

Angle irons 42 are shown secured to the plates 39 and and provided with vertical guides 43. Links 44 have their outer ends pivoted at 45 to the movable scale frame, and their inner ends provided with eyes 46 slidably engaging the guides 43, for controlling or directing the movement of said frame. The movable scale frame comprises two longitudinal I-beams 47, rigidly connected together by series of suitable braces 48, 49, and 50. The lower edges of the longitudinal I-beams 47 are provided with bearing plates 51 for engaging suitable bearings, such as the knife edges 52, on the main levers, for supporting the movable frame on said levers. As shown especially in Fig. 7, an angle iron 53 is secured to one or both ends of the longitudinal beams 47 and carries a vertical guide 54. The guide 54 slidably engages an eye 55 in a link 56, which latter is pivotally secured at 57 to a bracket 58 embedded in the end wall 59 of the pit; thereby providing an additional guiding means coöperating with the guides 43 for controlling the movement of the movable frame.

Referring to Figs. 1, 2, 3, 4 and 13, the brace beams 50 are secured in pairs to the longitudinal I-beams 47 at points between the several I-beams 2 supporting the stationary platform 5. Chairs 64 are suitably secured on each pair of beams 50, as by bolts 65. The live track rails 66 are secured on the chairs 64 and extend upwardly through slots 67 in the stationary platform 5, to constitute the load supports of the scale. Guards 68, preferably formed of metal plates, are secured to the stationary platform 5 in position to shield the slots 67 in the latter from the entrance of foreign substances, and also to shield the live rails 66 in case of derailment of the cars, or other abnormal conditions.

As shown especially in Figs. 1 and 3, the live rails 66 extend along the intermediate portion of the movable scale frame, and terminate at a distance from the ends of the system of weighing levers; thereby providing a long stationarily supported overhang 69 at each end of the system of levers. By this construction, the loaded car to be weighed will first strike the live track rails 66 at a point substantially midway between the fulcrums of the first two extension levers at the end of the scale; thereby producing a uniform distribution of the load over the system of levers. This constitutes an important part of my invention, and it has been found in practice that, by so confining the load to an intermediate portion of the movable scale frame, the shock and wear occurring in existing types of scales through initial localization of the load on the end levers of the system is avoided.

Referring to Figs. 1, 2, 3, 4 and 9, the scale lever 29 is fulcrumed at 70 in a yoke 71 supported by two I-bolts 72. The I-bolts 72 are carried by an angle plate 73 secured to channel beams 74, which are rigidly supported in the walls of the pit. This method of fulcruming the scale lever, together with the yoke 27 and eye 28 connecting the inner end of said lever, provides sufficient play to prevent binding and to meet all conditions occurring in practice.

The outer end of the scale lever 29 carries a yoke 75, which is secured to the scale beam by a link 76 in the usual manner.

I have illustrated a preferred and satisfactory construction, but, obviously, changes could be made in the number of levers employed and other details within the spirit and scope of my invention.

Having thus described my invention, what I claim as new therein and desire to secure by Letters Patent is:—

1. In a weighing scale, the combination of a movable frame, a system of weighing levers supporting said frame, load supports carried by said frame, a stationary platform rigidly supported above said frame and provided with slots for receiving said load supports, and guards extending upwardly from said platform for shielding said slots and load supports, substantially as described.

2. In a weighing scale, the combination of a plurality of rigidly supported beams, a stationary platform supported on said beams and provided with slots, a system of weighing levers suspended from said beams, a movable frame positioned beneath said stationary platform and supported by said systems of levers, and load supports carried by said frame and extending through said slots in the platform, substantially as described.

3. In a weighing scale, the combination of a connected system of weighing levers, load supports carried thereby and terminating substantially midway between the fulcrums of the end pairs of said levers, a stationary platform rigidly supported above said system of levers and provided with slots for receiving said load supports, and guards for shielding said slots and load supports, substantially as described.

4. In a weighing scale, the combination of a plurality of rigidly supported beams, a stationary platform supported on said beams and provided with slots, a system of weighing levers suspended from said beams, a movable frame positioned beneath said stationary platform and supported by said system of levers, load supports carried by said frame and extending through said slots in the platform, and guards carried by said platform for shielding said slots and load supports, substantially as described.

5. In a weighing scale, the combination of a system of weighing levers comprising coöperating extension levers and sets of main levers, a common support for the several levers of each set, a movable frame supported by said system of levers, load supports carried by said frame, and guides carried by said supports of the levers for controlling the movement of said frame, substantially as described.

6. In a weighing scale, the combination of a system of weighing levers comprising coöperating extension levers and sets of main levers, a common support for the several levers of each set, a movable frame supported by said system of levers, load supports carried by said frame, and links connecting said frame to the supports of the levers for controlling the movement of said frame, substantially as described.

7. In a weighing scale, the combination of a system of weighing levers comprising coöperating extension levers and sets of main levers, a common support for the several levers of each set, a movable frame supported by said system of levers, load supports carried by said frame, guides carried by the supports of said levers, and links connected to said frame and slidably engaging said guides, substantially as described.

8. In a weighing scale, the combination of a system of weighing levers, a stationary platform extending over said system of levers and provided with slots terminating at a distance from its ends, a movable frame supported on said system of levers, and load supports extending upward from said frame through said slots in the stationary platform, substantially as described.

In testimony whereof I affix my signature in presence of two witnesses.

WILLIAM N. GILBERT.

Witnesses:
JAMES W. STURTEVANT,
CHARLES A. BALL.